Oct. 18, 1932.  H. W. SANFORD  1,882,957
WHEEL AND AXLE
Filed Jan. 20, 1930  7 Sheets-Sheet 1
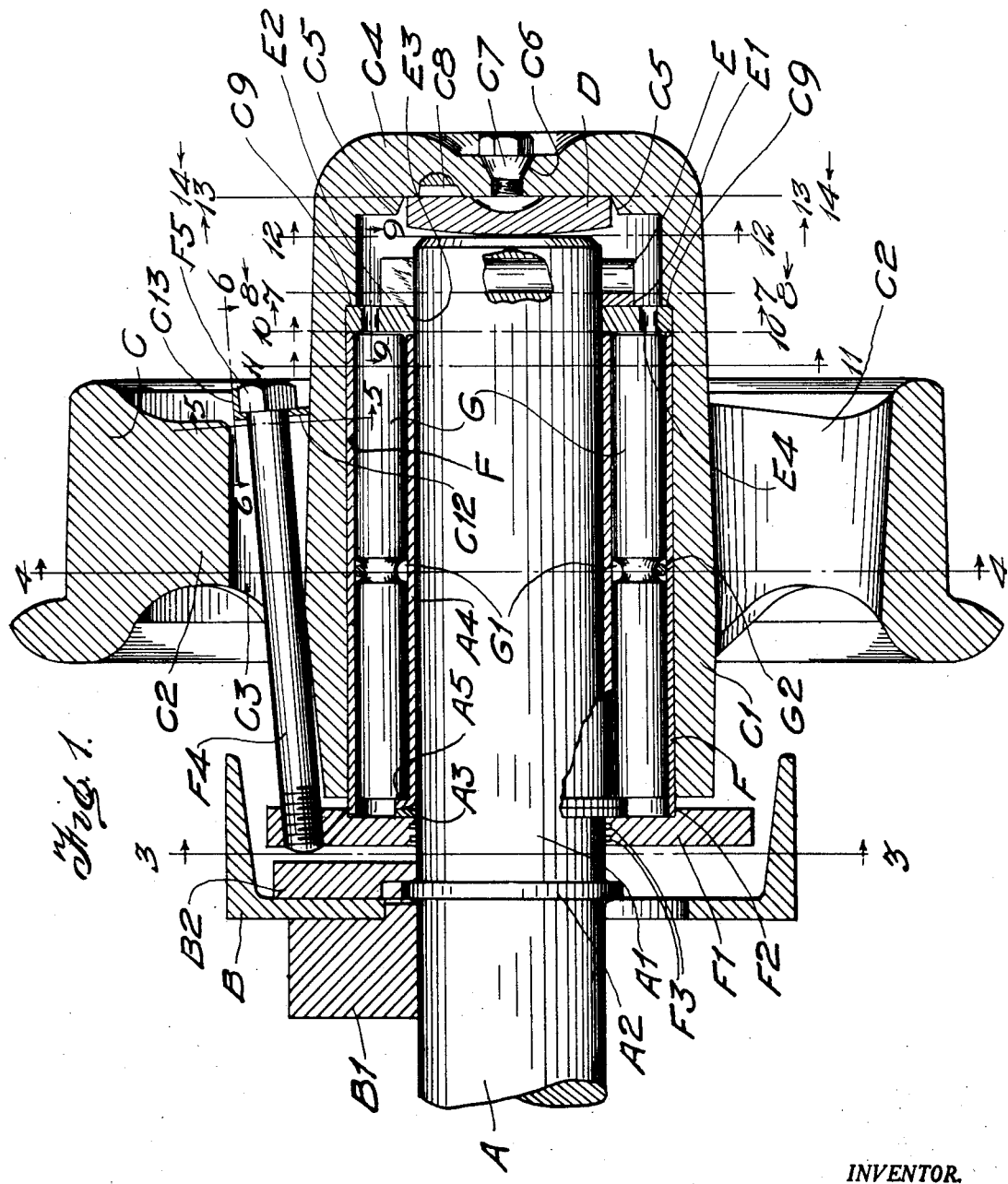
INVENTOR.
Hugh W. Sanford
BY Cyrus ...
ATTORNEY

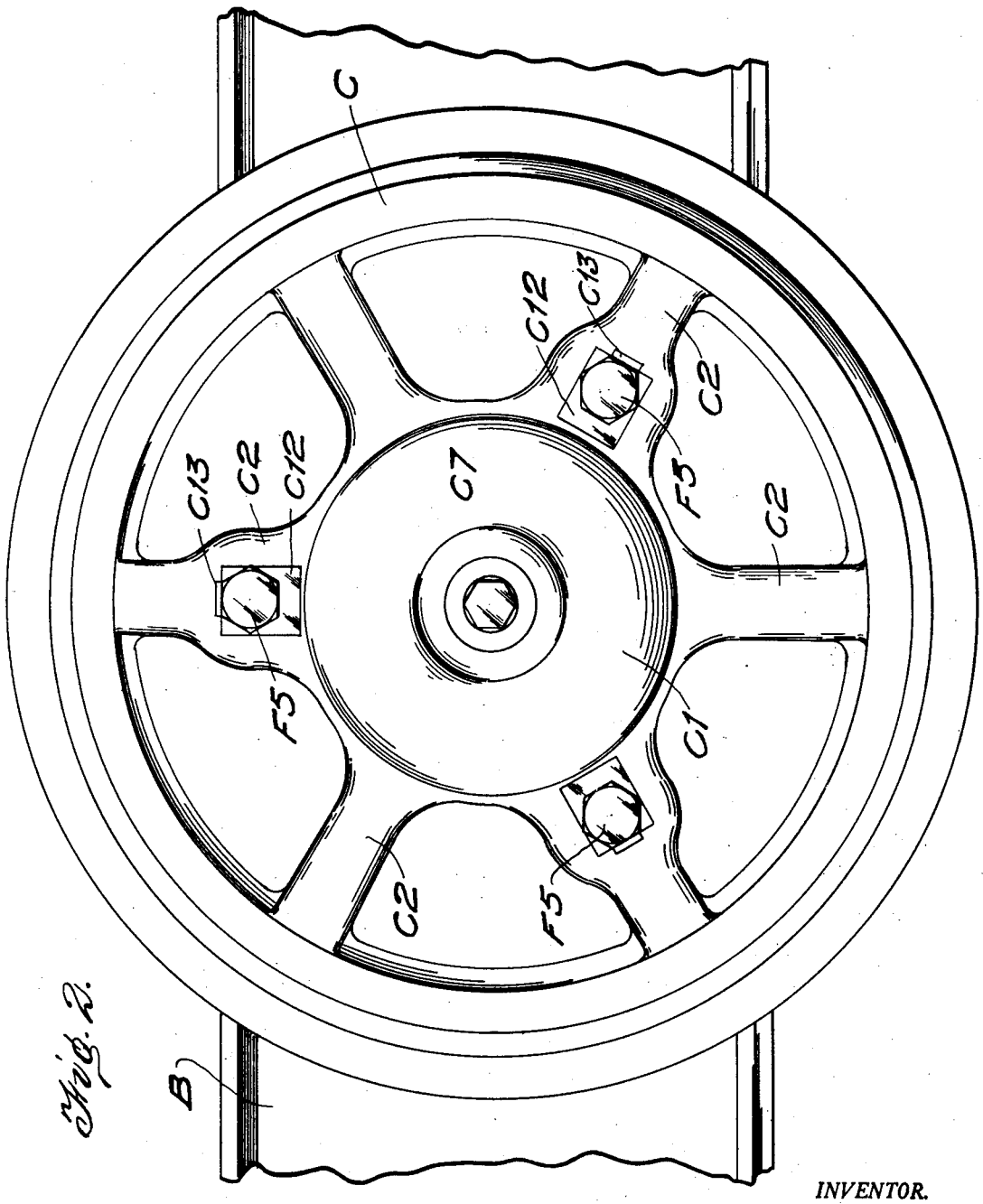

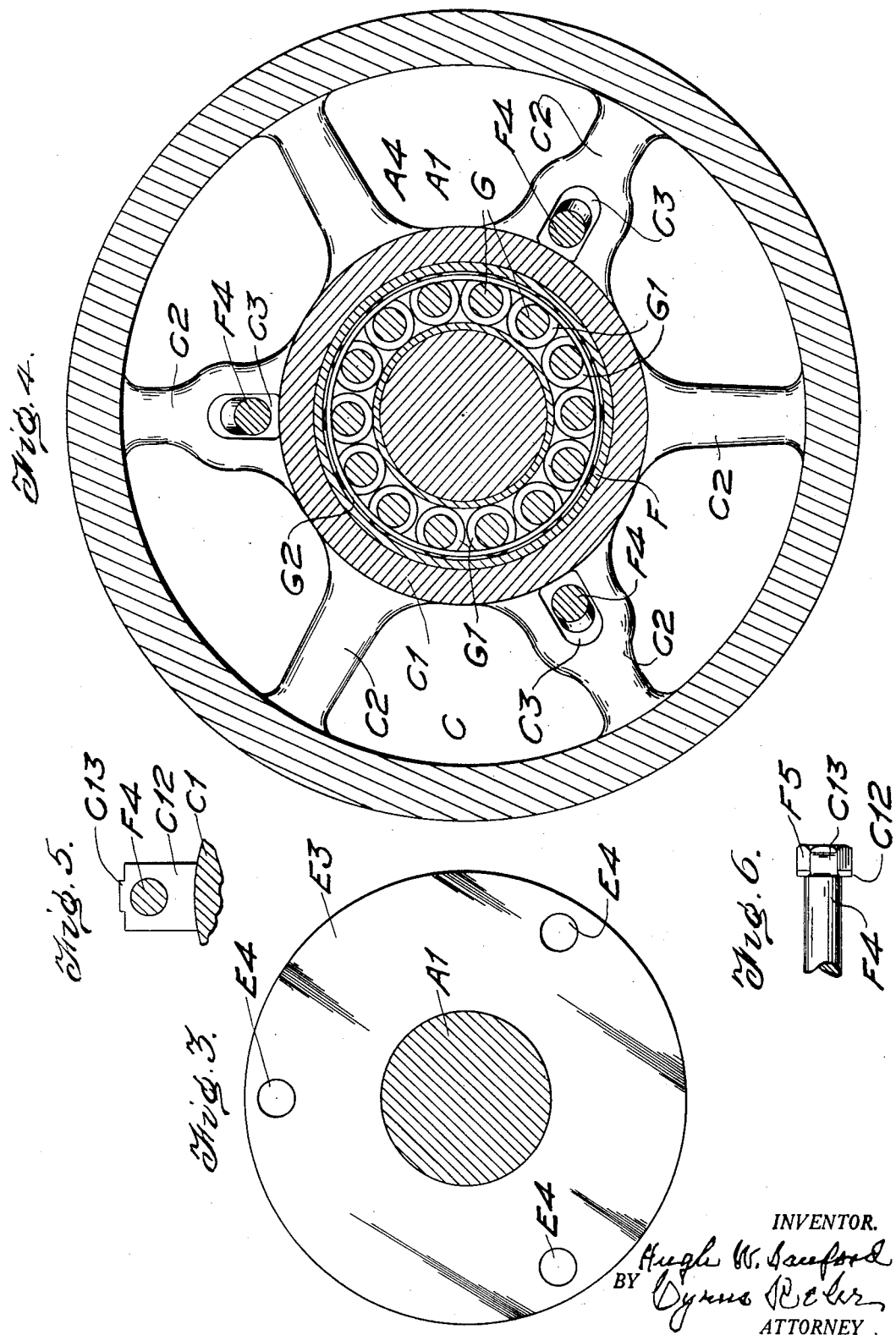

Oct. 18, 1932.   H. W. SANFORD   1,882,957
WHEEL AND AXLE
Filed Jan. 20, 1930   7 Sheets-Sheet 4
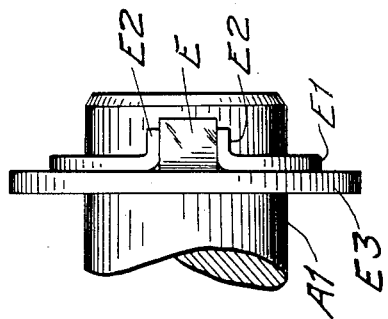
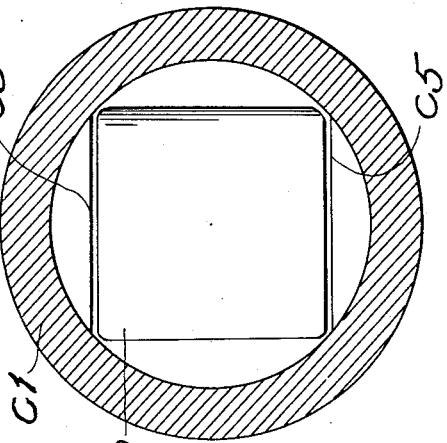
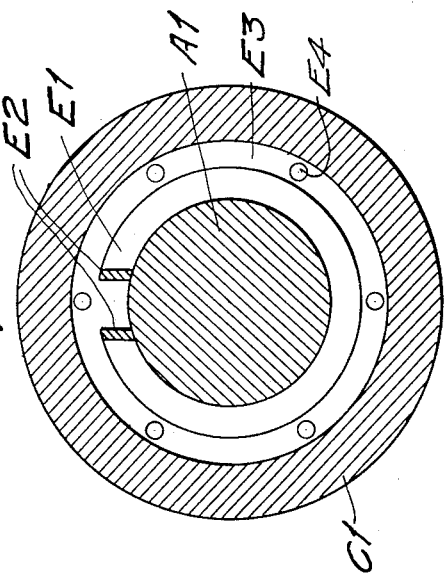
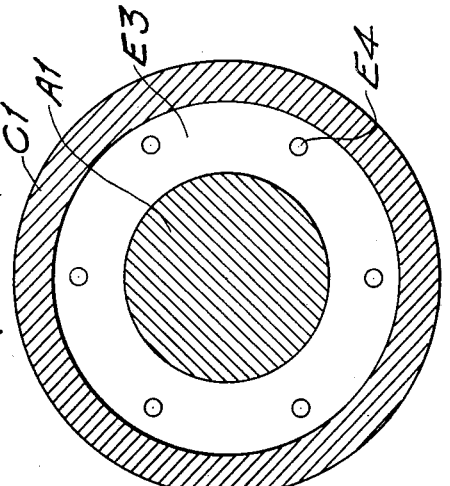
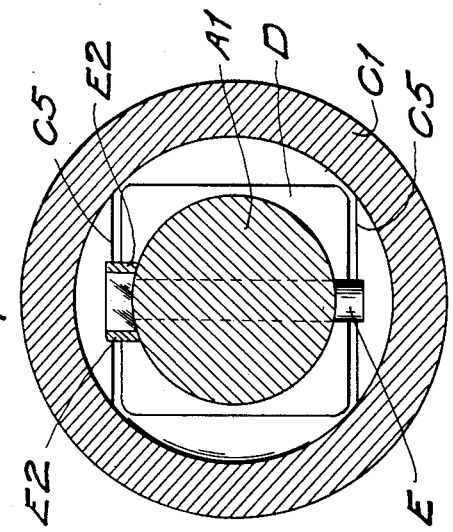
INVENTOR.
Hugh W. Sanford
BY Cyrus Weller
ATTORNEY.

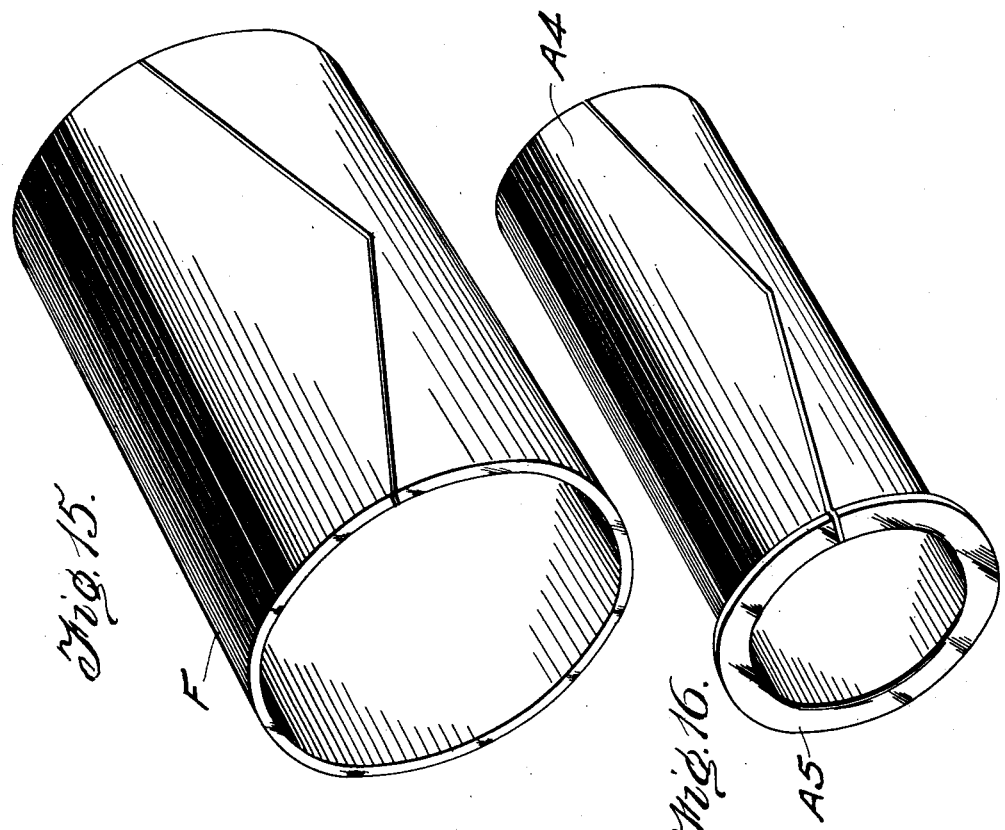
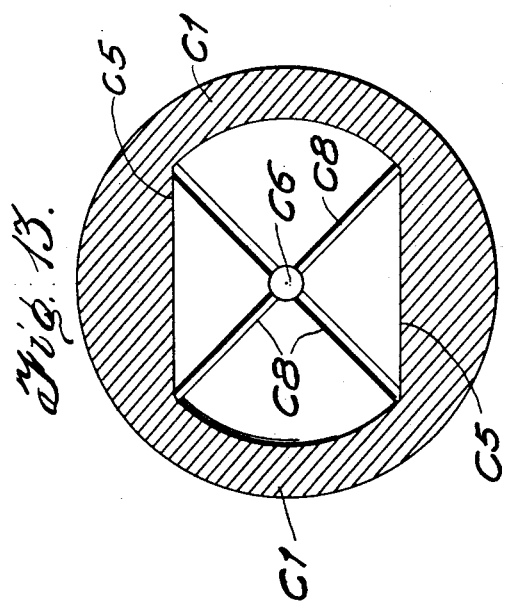
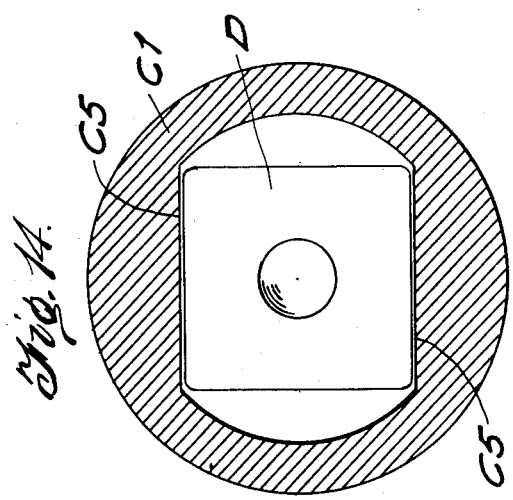

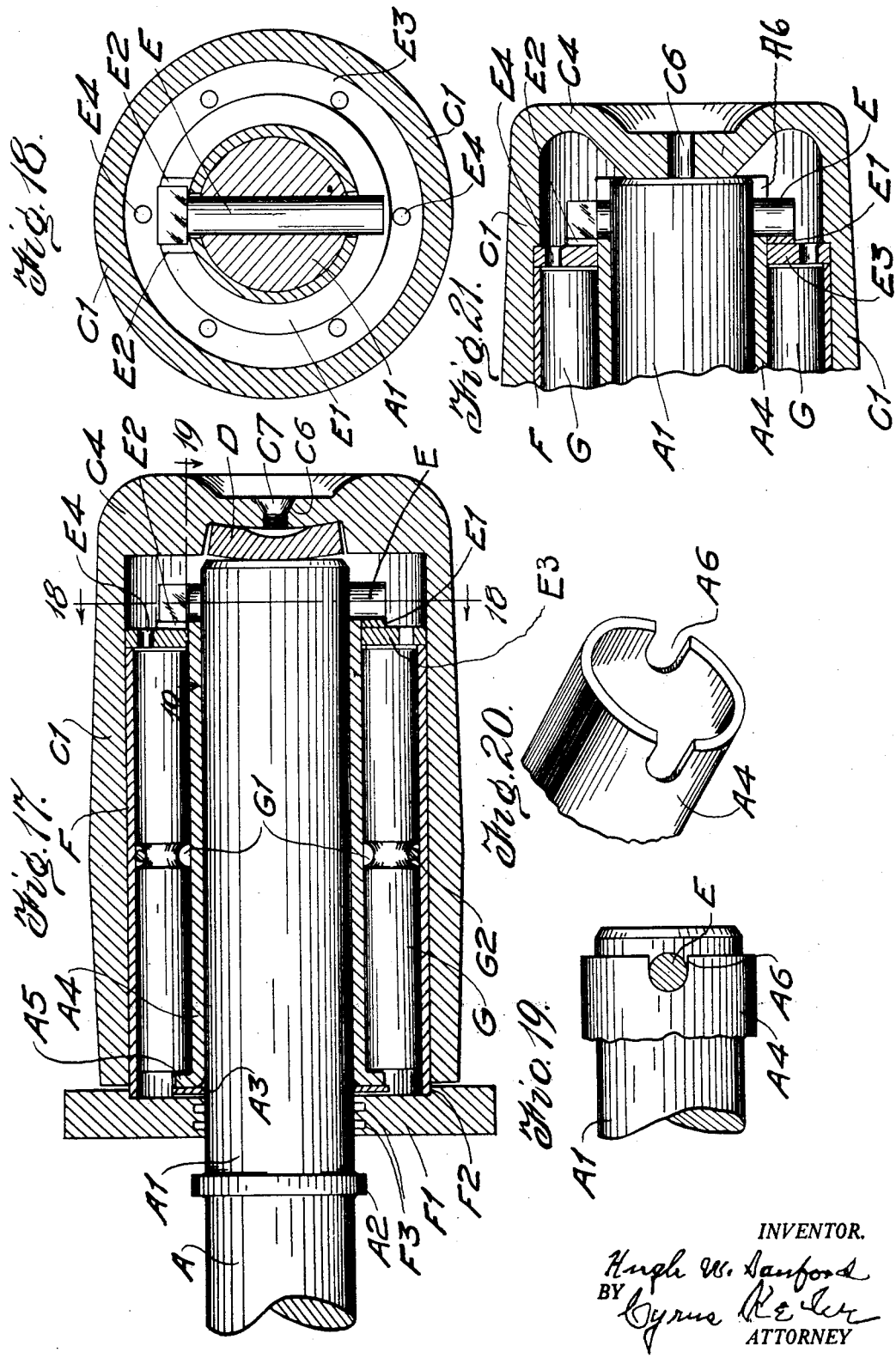

Oct. 18, 1932.　　　H. W. SANFORD　　　1,882,957
WHEEL AND AXLE
Filed Jan. 20, 1930　　　7 Sheets-Sheet 7
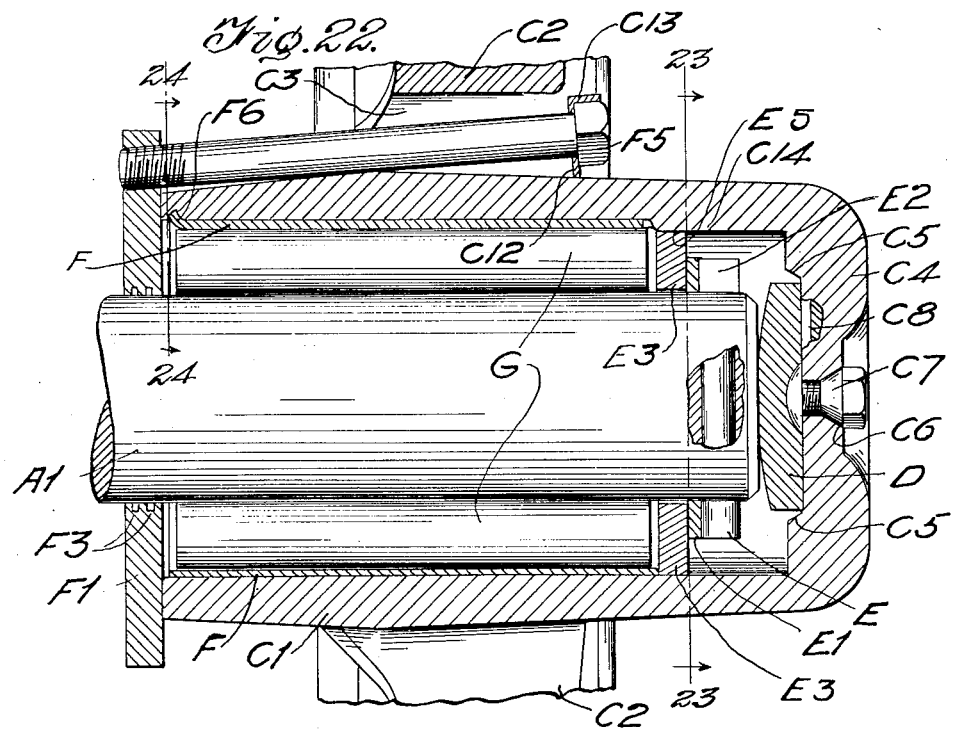
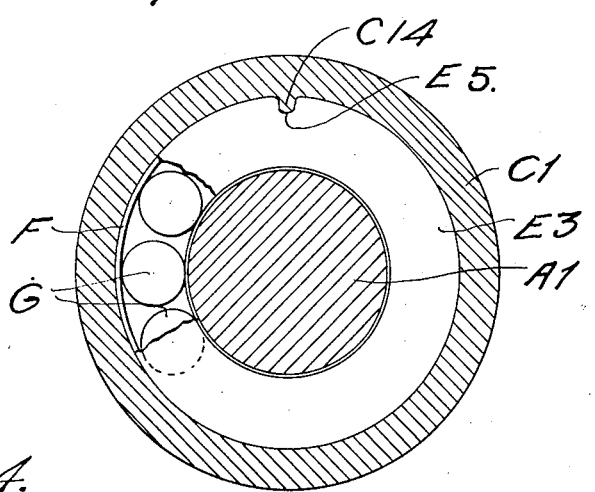
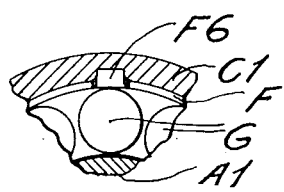
INVENTOR.
Hugh W. Sanford
BY
ATTORNEY Patented Oct. 18, 1932

1,882,957

UNITED STATES PATENT OFFICE

HUGH W. SANFORD, OF KNOXVILLE, TENNESSEE

WHEEL AND AXLE

Application filed January 20, 1930. Serial No. 422,152.

This invention relates more especially to wheels and axles of such railway cars as are used in mining operations and for similar purposes. In some such cars, the axles rest in fixed bearings on the frame or body of the car and have their ends projecting outward beyond said bearings into the hubs of the wheels in a manner making the wheels free for rotation on the axles. This invention relates to structures of that type.

In such wheel and axle structures, it is desirable that all of the wearing parts for taking end thrusts be located within the space enclosed by the hub, that space constituting a lubricant chamber for delivery of lubricant to the axle and the antifriction rollers (if such rollers are used) and the inner faces of the hub and the means whereby engagement is made between the axle and the hub for controlling or limiting endwise movement of the hub on the axle.

It is also desirable that provision be made for the injection of lubricant through the outer end wall of the hub at or near the axial line of the hub, the lubricant going thence by ready flow to all parts of the interior of the hub. Furthermore, it is also desirable that, while the inner end wall of the hub is to surround the axle or axle journal so closely as to normally prevent the outward flow of lubricant between the surface of the axle or journal and said end wall, yet under abnormal pressure it will allow flow of lubricant outward from the interior of the hub, in order that when lubricant is driven through the outer end of the hub into the interior of the hub the fresh lubricant may drive used and dirty lubricant outward from the interior of the hub between the face of the axle or journal and said end wall of the hub, whereby harmful accumulation of dirty lubricant within the hub may be prevented.

It is also desirable to have antifriction rollers free from each other and free at their ends.

It is further desirable to place wearing faces on detachable or removable pieces, in order that when any face becomes worn to an objectionable extent, removal of an auxiliary part will allow replacing a new face by replacing the part which is to be removed. Making provision for such removal and substitution allows making those parts of wear-resisting material without making all of the hub and other larger parts of such material.

It is also desirable that the organization of the axle and the wheel and its hub be in such manner as to permit easy assembly for attachment of the wheel to the axle or journal in working form and to allow easy separation of parts for removal of the wheel and associated parts from the axle or journal. In this connection it is to be noted that in such cars the wheel is usually placed close to a side sill or similar member through which the axle extends. Placing the wheel near such member calls for special effort to make the structure compact and to put into the structure means accessible from the outer side of the wheel for joining or binding parts together during assembling and for releasing such parts from each other when the wheel and associated parts are to be removed from the axle or journal.

The object of this invention is to provide a wheel and axle structure meeting the above-mentioned requirements.

In the accompanying drawings,

Fig. 1 is an upright longitudinal section illustrating a wheel and axle structure embodying my improvement;

Fig. 2 is an elevation of the structure of Fig. 1, looking toward the left;

Fig. 3 is an upright section on the line, 3—3, of Fig. 1, looking toward the right;

Fig. 4 is an upright section on the line, 4—4, of Fig. 1, looking toward the right;

Fig. 5 is an upright section on the line, 5—5, of Fig. 1, looking toward the right;

Fig. 6 is an approximately horizontal section on the line, 6—6, of Fig. 1, looking downward;

Fig. 7 is an upright section on the line, 8, 7—7, 8, of Fig. 1, looking toward the right;

Fig. 8 is an upright section on the line, 8, 7—7, 8, looking toward the left;

Fig. 9 is a horizontal section on the line, 9—9, of Fig. 1, looking downward;

Fig. 10 is an upright section on the line, 10—10, of Fig. 1, looking toward the right;

Fig. 11 is an upright section on the line,

11—11, of Fig. 1, looking toward the right;

Fig. 12 is an upright section on the line, 12—12, of Fig. 1, looking toward the right;

Fig. 13 is an upright section on the line, 14, 13—13, 14, of Fig. 1, looking toward the right;

Fig. 14 is an upright section on the line, 14, 13—13, 14, of Fig. 1, looking toward the left;

Fig. 15 is a perspective of the hub lining;

Fig. 16 is a perspective of the sleeve surrounding the journal;

Fig. 17 is a detail, longitudinal section, similar to Fig. 1; showing engagement between the journal sleeve and the cotter;

Fig. 18 is a horizontal section on the line, 18—18, of Fig. 17, looking toward the left;

Fig. 19 is a horizontal section on the line, 19—19, of Fig. 17, looking downward;

Fig. 20 is a detail perspective of the outer end of the journal sleeve shown in Figs. 17 and 19;

Fig. 21 is a detail, longitudinal section, similar to Fig. 17, showing direct contact between the hub end wall and the end face of the journal;

Figs. 22, 23 and 24 illustrate a variation of the form illustrated by Fig. 1 and associated figures.

Referring first to Figs. 1 to 16, inclusive, of said drawings, A is a part of one of the axles of such a car. A1 is a journal on one end of said axle. A2 is a circumferential shoulder at the junction of the journal, A1, and the body of the axle, A. Said shoulder is used as a means to engage the axle to a part of the car frame or body, in any suitable manner. In Fig. 1, B is a side sill of a car frame, and the axle extends through said sill. A member, B1, rests on the body of the axle and supports the sill, B. A member, B2, bears against the sill, B, and against the outer face of the annular shoulder, A2. In this or in any similar manner the axle is held against endwise movement relative to the car frame. The supporting of the axle and the car frame or body relative to each other does not constitute a part of the present invention. Hence means for accomplishing such engagement need not here be shown and described in detail.

The present invention relates to the wheel structure and to the manner of applying the wheel around the journal, A1, and holding the wheel rotatably on the journal, but substantially against lengthwise movement on the journal in either direction, excepting when certain members forming a part of the wheel structure have been released as hereinafter described. As described further on, roller bearings are located between the hub and the journal, A1, and provision is made for retaining those rollers in position on the journal when the wheel has been removed or when the parts are being assembled.

The means for preventing outward movement of the wheel on the journal, A, include a member fixed transversely on the journal, A1, near its outer end. In Fig. 1 that member is the cotter or cross pin. Movement of the wheel on the journal, A1, inward toward the body, A, of the axle is prevented by engagement, either directly or through an intermediate member, between the outer end of the journal, A1, and the end wall of the hub of the wheel. In Fig. 1 of the drawings, that intermediate member is a plate of high carbon tempered steel.

C is the wheel. C1 is the hub of the wheel. C2 are the spokes of the wheel. C3 are openings through three of the spokes parallel to the hub axis and near the hub. C4 is the outer end wall of the hub, said wall being shown integral with other parts of the hub.

In the form illustrated by Figs. 1 to 14, inclusive, the wall, C4, bears against an upright wearing plate, D; and that plate bears against the end face of the journal, A1. Said plate is shown rectangular and is kept in position, and made to rotate with the hub, by shoulders, C5, formed on the inner face of the wall, C4. The face of the plate, D, which makes contact with the journal is preferably made slightly convex, in order that the area of contact between said plate and the end face of the journal may be limited.

On the axial line of the hub, a port, C6, is formed through the wall, C4. The outer part of said port is flaring and the inner, smaller part is screw-threaded. A plug, C7, is formed to fit into and seal said port, the inner or smaller part of the plug being screw-threaded to fit the threads of the port. Around said port the outer face of the wall, C4, is recessed or indented far enough to bring the outer face of the plug approximately even with the surrounding face of the wall, C4. Said head should not project beyond the surrounding face of said wall. By thus keeping the head of the plug within said recess, said plug is guarded against contact with objects along the course traversed by the car.

It is to be understood that this plug, C7, may be solid and adapted to be removed to allow a lubricant delivery nozzle to be seated in the port, C6, for the delivery of lubricant through said port into the hub. But it is to be understood that said plug may be a tubular, valved grease screw to which a lubricant delivery nozzle may be coupled. Such grease screws or plugs are already known in this art. Opposite the inner end of the port, C7, the adjacent face of the plate, D, is concaved to allow lateral passing of lubricant after the lubricant issues from the port, C6. On the inner face of the wall, C4, lubricant ways, C8, radiate from the port, C6, one such way reaching to each corner of the plate, D. Thus grease discharged through the port, C6, can move laterally to the four corners of the plate, D, and thence into the open spaces at the edges of the plate which are free from the shoulders, C5. It is to be understood that these grease ways may be of any desired number and may, if so desired, be located to have their outer ends at any places between the shoulders, C5. When the lubricant has been discharged into the spaces at the side edges of the plate, the course of the lubricant is into the spaces between the anti-friction rollers, as will be described further on.

It will be observed that the contact between the wall, C4, and the plate, D, and the contact between that plate and the end face of the journal, A1, will hold the hub against movement inward on the journal toward the body, A, of the axle or toward the body of the car.

The means for holding the hub against outward movement on the journal, A1, will now be described.

A cotter pin or cross pin, E, extends transversely through the journal near the end face of the journal. A washer, E1, surrounds the journal and bears against the inner face of the cotter. Said washer has two tongues, E2, one being at each side of and overlapping the side faces of the cotter head. Said tongues prevent rotation of the washer, E1, on the journal. (See Figs. 1, 7 and 9.) A collar, E3, surrounds the journal, A1, at the inner side of the washer, E1, and extends outward beyond the washer, E1 and to the side wall of the hub. On the inner face of the main wall of the hub is an annular shoulder C9, directed toward the inner end of the hub forming an abutment against which the outer face of the collar, E3, bears. Thus outward movement of said collar relative to the body of the hub is prevented. Within the hub is a lining, F, bearing against the inner face of the main hub wall and bearing by its outer end against the collar, E3. Thereby the collar, E3, is pressed against the abutment C9, and the lining is prevented from further outward movement in the hub. Movement of the lining, F, away from the collar, E3, is prevented by engagement of the opposite or inner end of said lining with the inner end wall or plate, F1. Said plate has an annular shoulder, F2, surrounding and bearing against the outer face of the sleeve, F. The hub lining projects out of the end of the hub far enough to prevent the end wall, F1, from bearing against the end of the body of the hub. By the means described a seal to prevent outward passage of lubricant is formed; and the engagement with the shoulder, F2, constitutes one means for supporting the end wall, F1, against movement transversely to the journal. Another factor for preventing such movement is the engagement of said end wall with the journal, the wall fitting closely to the journal and having packing grooves, F3, adapted to receive packing bearing on the journal for forming a seal around the journal to limit outward movement of lubricant (under normal pressure) from the interior of the hub and to prevent or limit ingress of dust and dirt.

The end wall, F1, is drawn horizontally toward the end of the body of the hub, C1, by means of bolts, F4, which extend through the apertures, C3, in three of the spokes, C2, of the wheel. Each aperture, C3, is sufficiently narrow to prevent the passing of the head, F5, of the bolt through said aperture. The other end of the bolt, F4, is screw-threaded into the end wall, F1. By turning the three bolts in the direction for pulling, the end wall, F1, is drawn firmly against the adjacent end of the hub lining, F, to press the outer end of the lining against the collar, E3, whereby that collar is pressed against the abutment C9. It is to be remembered that the hub lining projects far enough beyond the inner end of the hub body to prevent contact between the end wall and the end of the hub body when the bolts have been drawn to cause the end wall to press the end of the hub lining against the collar, E3.

Now it will be seen that the collar, E3, and the hub lining, F, and the end wall, F1, and the hub body are firmly bound to each other, and that the entire hub or the entire wheel is held against outward movement on the journal, if the collar, E3, is held against outward movement. That is accomplished by the small washer, E1, and the cotter pin or cross pin, E. The cross pin constitutes the major member or abutment in thus holding the hub. The washer, E1, is inserted between the cotter pin, E, and the larger collar, E3, to form an extended face for contact with the collar, E3, instead of bringing the collar, E3, directly into contact with the cotter, E.

It is to be observed that the engagement of the collar, E3, by the hub shoulder or abutment, C9, and the outer end of the hub lining, F, holds the collar, E3, for rotation with the hub. As above explained, the small washer, E1, is held stationary on the journal, A1, by means of the tongues, E2. Thus the collar, E3, rotates in contact with the adjacent face of the smaller stationary washer, E1.

It is to be observed that the parts are to be so proportioned and adjusted as to leave slight play or easy contact between the bearing plate, D, and the end of the journal, on the one hand, and between the washer, E1, and the collar, E3, on the other hand. This allows easy rotation of the wheel on the journal and allows slight endwise movement of the wheel on the journal, A1. Figs. 1 and 6, show a locking plate, C12, extending around the shaft of the bolt, F4, and lying against the inner face of the head, F5, of the bolt. One edge of said locking plate is formed to bear against the adjacent outer face of the hub to prevent turning of the plate relative to the hub. On the plate is a tongue, C13, adapted to be bent to bear against one of the outer faces of the bolt head when the bolt has been turned to bind the end wall, F1, against the hub lining, F.

Within the hub, a washer A3, surrounds the journal and rests loosely beside the end wall, F1. Between that washer and the collar, E3, the journal, A1, is surrounded by a sleeve, A4. The end of the sleeve, A4, adjacent the washer, A3, has a flange, A5, overlapping said washer. The other end of the sleeve, A4, extends nearly to the collar, E3. Said sleeve is to remain stationary on the journal. Hence its outer end is not to bear against the collar, E3, that collar rotating with the hub.

Between the hub lining, F, and the sleeve, A4, are anti-friction rollers, G, arranged parallel to each other and to the journal, A1. These rollers are free at their ends and are spaced from the collar, E3, and the flange, A5, of the journal sleeve, A4.

Figs. 1 and 4 show the rollers provided with circumferential grooves, G1, approximately midway between their ends. A light ring, G2, surrounds the entire group of rollers and lies in the grooves, G1. This is for the purpose of keeping the rollers in position on the journal before the hub lining, F, has been put into place. Said lining is slotted as shown in Fig. 15. That permits flexing to facilitate insertion of the lining into the hub. The sleeve, A4, is shown similarly slotted in Fig. 16, to facilitate placing it on the journal, A1.

It is to be understood that the wearing plate, D, and the hub lining, F, and the journal sleeve, A4, and the several washers and the collar, E3, are to be made of hard metal adapted to long wear. It is also to be observed that those parts are made removable to permit replacing when said parts have become worn.

Between the outer edge of the washer, C1, and the horizontal wall of the hub, the collar, E3, has ports, E4, for the passage of lubricant from the space between the wearing plate, D, and the collar, E3. This permits the lubricant to pass between the rollers, G, and thence onward along the spaces between the rollers until the washer, A3, and the end wall, F1, are met.

The packing in the wall, F1, and the washer, A3, are to fit sufficiently to normally prevent the outward passing of lubricant and yet allow the passing of lubricant when pressure is transmitted to all the lubricant in the hub by the injecting of new lubricant through the port, C6, the pressure then exerted on the lubricant into the hub being above normal. In that way old or dirty lubricant may be discharged from the interior of the hub.

For assembling the structure, the axle is put into position on the car frame. Then the inner end wall or plate, F1, is placed around the outer end of the journal, A1, and moved inward toward the shoulder, A2. Then the washer, A3, is similarly moved into position around the journal and to the end wall, F1. The journal sleeve, A4, is next put into position. Then the rollers, G, with the ring, G2, in place around the group, are placed around the journal. Then the hub lining, F, is moved endwise into position around the group of rollers. Next the collar, E3, and the washer, E1, and the cross pin, E, are put into place. Now the wearing plate, D, is laid into its place on the inner face of the outer end wall, C4, of the hub and the hub then moved endwise around the hub lining, F, the collar, E3, resting against the shoulder or abutment, C9, and said collar forming an abutment for the hub lining, F. Next the bolts, F4, are extended through the locking plates, C12, the apertures, C3, in the wheel spokes and threaded into the inner end wall, F1, until said wall engages the adjacent end of the hub lining, F, and presses said lining toward the outer end of the hub until the outer end of the lining presses firmly against the collar, E3, whereby said collar is pressed against the annular shoulder or abutment, C9. Next the locking plate tongues, C13, are to be bent over the bolt heads. Thus the hub and the collar, E3, and the hub lining, F, and the hub end wall, F1, are firmly bound together and the structure made complete.

For dismantling for inspection or to replace worn parts, the above-recited assembling steps are to be reversed. When the binding bolts have been removed, the hub may be drawn outward, the hub lining remaining around the group of rollers, outward movement of said lining being prevented by the collar, E3. When that collar has been removed after removal of the cross pin and the washer, E1, the hub lining may be moved outward, the rings, G2, holding the rollers in position on the journal.

For extending the binding bolts, F4, through the apertures, C3, in the wheel spokes, C2, there is a purpose. That leaves a clear space between the spokes as large as otherwise permitted. This large space is desirable when these cars are not provided with brakes or when their brakes become disabled. Then, for locking the cars against movement on the track, a stick, in mine practice called a "sprag", is extended through one of said openings in one wheel and beneath the body of the car to and through such an opening in the opposite wheel. When that has been done, tendency toward movement of the car will bear the "sprag" against the bottom of the car body and stop movement. In mine operation, this method of locking a mine car is called "spragging".

In Fig. 17, the journal sleeve, A4, extends to the cotter, E, and the collar, E3, and the washer E1 surround said sleeve.

In Figs. 19, 20 and 21, the journal sleeve, A4, extends outward beyond the cotter, E, the sleeve having notches, A6, to receive the cotter. Thereby the sleeve is held against rotation on the journal.

In Fig. 21 the wearing plate, D, is omitted and the outer end wall, C4, bears directly on the end of the journal.

Regarding the hub lining, F, it is to be observed that the outer face of said lining constitutes a large area for frictional engagement with the inner face of the hub, whereby said engagement is made sufficient to hold the said lining for rotation with the hub and to remain around the rollers when the wheel is moved outward after the bolts, F4, have been detached from the end wall, F1. To facilitate making such frictional engagement, the exterior diameter of the lining body may be slightly larger than the interior diameter of the hub, and the slot shown by Fig. 15 of the drawings made wide enough to allow slight reduction of the lining body by applying outward pressure while the lining is being moved endwise into the hub.

In Figs. 22, 23 and 24, there are variations from the form shown by Fig. 1 and the sections made on Fig. 1. In this last form, the hub lining, F, bears against the collar, E3, as shown in the lower right hand part of Fig. 22; but said lining does not bear against the end wall or plate, F1. Said plate bears against the end of the hub, C1. To prevent the hub lining from moving endwise away from the collar, E3, a tongue, F6, at the inner end of the hub lining is bent into a recess in the inner face of the hub. (Figs. 22 and 24).

To prevent the collar, E3, from turning, it is provided with a groove, E5, across its outer edge to receive a rib, C14, formed longitudinally on the inner face of the side wall of the hub, C1. The journal sleeve, A4, is omitted. The grooves, G1, and the ring, G2, are omitted from the rollers G.

It is to be kept in view that the hub lining is a thrust-resisting member functioning to hold the hub against outward movement on the journal the outer end of the lining being placed into engagement with the journal by means held on the journal within the hub and free from the hub for relative movement, along with the lining, to and through the inner end of the hub, and the inner end of the lining being placed into engagement with the hub by means engaging the lateral exterior of the hub and placed into engagement with the inner end of the lining, whereby the lining functions as a thrust-resisting member.

I claim as my invention,

1. In a structure of the kind described, the combination with an axle journal, of a removable hub lining, a collar surrounding the journal at the outer end of the lining and forming an abutment for the lining, means removably supported on the journal at the outer side of said collar and forming an abutment for said collar, a wheel hub surrounding said lining and having an outer end wall in operative relation with the end of the journal to oppose movement of the hub inward toward the car body and the hub having near its outer end an interior transverse annular shoulder directed toward the inner end of the hub and serving as an abutment for said collar, binding means including an inner end wall between the wheel hub and said lining for drawing the lining toward said collar, a sleeve around the journal, and a washer surrounding the journal between said sleeve and the inner end wall.

2. In a structure of the kind described, the combination of a journal, a hub surrounding the journal, a loose-fitting lining placed within the hub and adapted to serve as a thrust-resisting member, means engaging the outer part of the lining with the journal to hold said lining against outward movement on the journal, and means forming releasable engagement between the inner end of the lining and the lateral exterior of the hub, whereby the lining and associated members hold the hub against outward movement on the journal.

3. In a structure of the kind described, the combination of a journal, a hub surrounding the journal, a loose-fitting lining placed within the hub and adapted to serve as a thrust-resisting member, means on the journal adjacent the outer end of the lining and constituting an abutment for the outer end of the lining to hold the lining against outward movement on the journal, and means forming releasable engagement between the inner end of the lining and the lateral exterior of the hub, whereby the lining and associated members hold the hub against outward movement on the journal.

4. In a structure of the kind described, the combination of a journal, a hub surrounding the journal, a loose-fitting lining placed within the hub and adapted to serve as a thrust-resisting member, an annular member surrounding and immovably seated on the journal adjacent the outer end of the lining and constituting an abutment for the outer end of the lining to hold the lining against outward movement on the journal, and means forming releasable engagement between the inner end of the lining and the lateral exterior of the hub, whereby the lining and associated members hold the hub against outward movement on the journal.

5. In a structure of the kind described, the combination of a journal, a hub surrounding the journal, a loose-fitting lining placed within the hub and adapted to serve as a thrust-resisting member, a cross member on the journal adjacent the outer end of the lining and constituting an abutment for the outer end of the lining to hold the lining against outward movement on the journal, and means forming releasable engagement between the inner end of the lining and the lateral exterior of the hub, whereby said lining and associated members hold the hub against outward movement on the journal.

6. In a structure of the kind described, the combination of a journal, a hub surrounding the journal, a loose-fitting lining placed within the hub and adapted to serve as a thrust-resisting member, a cross member and an annular member surrounding the journal between the cross member and the outer end of said lining and forming an abutment for said lining to hold said lining against outward movement on the journal, and means forming releasable engagement between the inner end of the lining and the lateral exterior of the hub, whereby said lining and associated members hold the hub against outward movement on the journal.

7. In a structure of the kind described, the combination of a journal, a hub surrounding the journal, a loose-fitting lining placed within the hub and adapted to serve as a thrust-resisting member, a cross member and two annular members surrounding the journal between the cross member and the outer end of said lining and forming an abutment for said lining to hold said lining against outward movement on the journal, and means forming releasable engagement between the inner end of the lining and the lateral exterior of the hub, whereby said lining and associated members hold the hub against outward movement on the journal.

8. In a structure of the kind described, the combination of a journal, a hub surrounding the journal, a loose-fitting lining placed within the hub and adapted to serve as a thrust-resisting member, a cross pin, and two annular members surrounding the journal between the cross member and the outer end of the lining to hold said lining against outward movement on the journal, one of said annular members being held for rotation with the hub and the other annular member being held immovably on the journal, and means forming releasable engagement between the inner end of the lining and the lateral exterior of the hub, whereby said lining and associated members hold the hub against outward movement on the journal.

9. In a structure of the kind described, the combination of a journal, a hub surrounding the journal, a loose-fitting lining placed within the hub and adapted to serve as a thrust-resisting member, a cross pin, and two annular members surrounding the journal between the cross member and the outer end of the lining to hold said lining against outward movement on the journal, one of said annular members being formed for inter-engagement with the cross member to prevent turning of said annular member on the journal and the other annular member being engaged by the hub and the adjacent end of the lining for rotation with the hub and the lining, and means forming relasable engagement between the inner end of the lining and the lateral exterior of the hub, whereby said lining and associated members hold the hub against outward movement on the journal.

10. In a structure of the kind described, the combination of a journal, a hub surrounding the journal and having at its outer end an oil port, a loose-fitting lining placed within the hub and adapted to serve as a thrust-resisting member, a cross member, an annular member surrounding the journal between the cross member and the outer end of the lining to hold said lining against outward movement on the journal and said annular member having openings for the passing of lubricant, and means forming releasable engagement between the inner end of the lining and the lateral exterior of the hub, whereby said lining and associated members hold the hub against outward movement on the journal.

11. In a structure of the kind described, the combination of a journal, a hub surrounding the journal, a loose-fitting lining placed within the hub and adapted to serve as a thrust-resisting member, a cross pin on the journal adjacent the outer end of the lining, an annular member surrounding the journal between the cross pin and said lining and having extensions engaging the cross pin and said annular member being a means for holding the lining from outward movement on the journal, and means forming releasable engagement between the inner end of the lining and the lateral exterior of the hub, whereby said lining and associated members hold the hub against outward movement on the journal.

12. In a structure of the kind described, the combination of a journal, a hub surrounding the journal, a loose-fitting lining placed within the hub and adapted to serve as a thrust-resisting member, means engaging the outer part of the lining with the journal to hold said lining against outward movement on the journal, and a shaft-form member supported on the lateral exterior of the hub and in releasable operative relation with the inner end of said lining, whereby the lining and associated members hold the hub against outward movement on the journal.

13. In a structure of the kind described, the combination of a journal, a hub surrounding the journal, a loose-fitting lining placed within the hub and adapted to serve as a thrust-resisting member, means engaging the outer part of the lining with the journal to hold said lining against outward movement on the journal, a loose-fitting inner end member surrounding the journal at the inner end of said lining, and means forming releasable engagement between said member and the lateral exterior of the hub, whereby the hub is held against outward movement on the journal.

14. In a structure of the kind described, the combination of a journal, a hub surrounding the journal, a loose-fitting lining placed within the hub and adapted to serve as a thrust-resisting member, means engaging the outer part of the lining with the journal to hold said lining against outward movement on the journal, a loose-fitting inner end wall surrounding the journal and extending across the inner end of said lining and laterally outward beyond the inner end of the hub, and means seated on the lateral exterior of the hub and releasably engaging said end wall, whereby said lining and associated members hold the hub against outward movement on the journal.

15. In a structure of the kind described, the combination of a journal, a hub surrounding the journal, a loose-fitting tubular lining placed within the hub and adapted to serve as a thrust-resisting member, an axle sleeve surrounding and nonrotatable on the journal, an annular member surrounding the journal and forming an abutment for the outer end of said lining, an end wall loose-fitting around the journal and extending across and bearing against the inner end of said lining and laterally outward beyond the inner end of the hub, and means seated on the lateral exterior of the hub and releasably engaging said end wall, whereby said lining and associated members hold the hub against outward movement on the journal.

16. In a structure of the kind described, the combination of a journal, a wheel having spokes and a hub surrounding the journal, a loose-fitting lining placed within the hub and adapted to serve as a thrust-resisting member, means engaging the outer part of the lining with the journal to hold said lining against outward movement on the journal, an inner end wall surrounding the journal and extending across the inner end of said lining and laterally outward beyond the inner end of the hub, and shaft-form members engaging spokes of the wheel and making engagement with said end wall, whereby said lining and associated members hold the hub against outward movement on the journal.

17. In a structure of the kind described, the combination of a journal, a wheel having spokes and a hub surrounding the journal, a loose-fitting lining placed within the hub and adapted to serve as a thrust-resisting member, means located within the hub for engaging the outer part of the lining with the journal to hold said lining against outward movement on the journal, an inner end wall surrounding the journal and extending across the inner end of said lining and laterally outward beyond the inner end of the hub, and shaft-form members extending through spokes of the wheel and making engagement with said end wall, whereby said lining and associated members hold the hub against outward movement on the journal.

18. In a structure of the kind described, the combination of a journal, a hub, a loose-fitting lining in the hub adapted to serve as a thrust-resisting member, a removable cross pin on the outer part of the journal, a washer surrounding the journal at the inner side of the cross pin and being formed for engagement with the cross pin to prevent rotation on the journal, a collar surrounding the journal at the inner side of said washer and engaged with the hub for rotation with the hub, and a member seated on the lateral exterior of the hub and in separable operative relation with the inner end of said lining, whereby said lining and associated members hold the hub against outward movement on the journal.

19. In a structure of the kind described, the combination of a journal, a hub, a loose-fitting lining in the hub adapted to serve as a thrust-resisting member, a removable cross pin on the outer part of the journal, a washer surrounding the journal at the inner side of the cross pin and being formed for engagement with the cross pin to prevent rotation on the journal, a collar surrounding the journal at the inner side of said washer, and bolts seated on the lateral exterior of the hub and in separable operative relation with the inner end of said lining, whereby said lining and associated members hold the hub against outward movement on the journal.

20. In a structure of the kind described, the combination of a journal, a hub surrounding the journal and having near its outer end an interior abutment shoulder facing toward the inner end of the hub, a loose-fitting lining in the hub and adapted to serve as a thrust-resisting member, a collar surrounding the journal and held against outward movement on the journal and having its periphery extending between said abutment shoulder and the adjacent end of said lining and engaged by said shoulder and the end of said lining, and a member seated on the lateral exterior of the hub and being in separable operative relation with the inner end of said lining, whereby said lining and associated members hold the hub against outward movement on the journal.

21. In a structure of the kind described, the combination of a journal, a hub surrounding the journal and having near its outer end an interior abutment shoulder facing toward the inner end of the hub, a loose-fitting lining in the hub and adapted to serve as a thrust-resisting member, a collar surrounding the journal and having its periphery extending between said abutment shoulder and the adjacent end of said lining, a washer surrounding the journal adjacent the outer face of the collar and being of smaller diameter than said collar and being free from said abutment shoulder, a cross member on the journal at the outer face of said washer, and a member seated on the lateral exterior of the hub and being in separable operative relation with the inner end of said lining, whereby said lining and associated members hold the hub against outward movement on the journal.

22. In a structure of the kind described, the combination of a journal having an outer end wall in which is an oil port, a hub, a loose-fitting lining placed in the hub and adapted to serve as an end thrust member, a cross member on the journal, a washer resting against the cross member and the end of the lining, a collar located between the washer and the end of the lining and extending outward beyond the periphery of the washer and having said extended part provided with openings for the passing of lubricant, and a member seated on the lateral exterior of the hub and in separable operative relation with the inner end of said lining, whereby said lining and associated members hold the hub against outward movement on the journal.

23. In a structure of the kind described, the combination of a journal, a hub surrounding the journal, a loose-fitting tubular lining placed within the hub and adapted to serve as a thrust-resisting member and held against outward movement on the journal, a sleeve surrounding the journal within the hub and held non-rotatably on the journal, and means forming releasable engagement between the inner end of said hub lining and the lateral exterior of the hub.

24. In a structure of the kind described, the combination of a journal, a hub surrounding the journal, a loose-fitting tubular lining placed within the hub and adapted to serve as a thrust-resisting member, rollers between the lining and the journal, and means forming releasable engagement between the inner end of said hub lining and the lateral exterior of the hub.

25. In a structure of the kind described, the combination of a journal, a hub surrounding the journal, a loose-fitting tubular lining placed within the hub and adapted to serve as a thrust-resisting member, a sleeve surrounding the journal within the hub and held non-rotatably on the journal, rollers between said lining and said sleeve, and means forming releasable engagement between the inner end of said hub lining and the lateral exterior of the hub, whereby the lining and associated members hold the hub against outward movement on the journal.

26. In a structure of the kind described, the combination of a journal, a hub surrounding the journal, thrust-resisting means placed between the hub and the journal and in engagement with the outer part of the journal, and means seated on the lateral exterior of the hub and being in separable operative relation with the inner part of said thrust-resisting means, whereby said thrust-resisting means and associated members hold the hub against outward movement relative to the journal.

27. In a structure of the kind described, the combination of a journal, a hub surrounding the journal, a loose-fitting lining placed within the hub and adapted to serve as a thrust-resisting member, releasable abutment means located on said journal within the hub and overlapping the outer end of said lining to prevent said lining from moving outward on said journal and said abutment means being within the hub and free from the hub for relative movement to and through the inner end of the hub whereby the hub may be moved outward without releasing said abutment means and said lining, and separable engaging means seated on the lateral exterior of the hub and in separable operative relation with the inner end of said lining.

28. In a structure of the kind described, the combination of a journal, a hub surrounding the journal and open at its inner end to receive a hub lining, a flexible lining placed within the hub and adapted to frictionally engage the hub and serve as a thrust-resisting member, means engaging the outer end of the lining with the journal to hold the lining against outward movement on the journal, and means extending across the inner end of the lining and forming releasable engagement between the inner end of the lining and the lateral exterior of the hub whereby the lining and associated members normally hold the hub against outward movement on the journal.

29. In a sturcture of the kind described, the combination of a journal, a wheel hub surrounding the journal, a lining yieldingly frictionally engaging the inner face of said hub and adapted to serve as a thrust-resisting member and having its inner end adjacent the inner end of the hub, means engaging the outer part of the lining with the journal to hold said lining against outward movement on the journal, and means engaging the inner edge of said lining and said wheel in manner to prevent the wheel from moving outward on said lining.

30. In a structure of the kind described, the combination of a journal, a wheel hub surrounding the journal, a lining yieldingly frictionally engaging the inner face of said hub and adapted to serve as a thrust-resisting member and having its inner end adjacent the inner end of the hub, a collar engaging the outer part of the lining with the journal to hold said lining against outward movement on the journal, and means engaging the inner edge of said lining and engaging said wheel in manner to prevent the wheel from moving outward on said lining.

31. In a structure of the kind described, the combination of a journal, a hub surrounding the journal, a lining yieldingly frictionally engaging the inner face of said hub and adapted to serve as a thrust-resisting member and having its inner end adjacent the inner end of the hub, a collar seated around said journal and held against outward movement on the journal and overlapping the outer end of the lining and relatively movable over the inner face of the hub, and means engaging the inner edge of said lining and engaging said wheel in manner to prevent the wheel from moving outward on said lining.

32. In a structure of the kind described, the combination of a journal, a wheel hub surrounding the journal, a lining releasably frictionally engaging the inner face of the hub and terminating adjacent the inner end of the hub, means engaging the inner end of said lining and said wheel in manner to normally prevent the wheel from moving outward on said lining, a collar surrounding and held on the outer part of the journal and overlapping the outer end of said lining, the outward reach of said collar being limited to the distance between the journal and the inner face of the hub along the length of said lining, whereby said collar constitutes an abutment for the outer end of the lining to hold the lining against outward movement on the journal and whereby said lining and said collar permit outward movement of the hub when the hub has been released from the inner end of the lining.

33. In a mine car wheel and axle structure, an axle journal, the combination of a hub open at its inner end to receive the lining, a bushing lining removably engaged in the hub, abutment means on the outer part of the journal positioned to engage the outer end of said lining, and releasable means engaging the hub and the inner end of the lining for pressing said lining toward and against said abutment means, and rollers between said lining and the journal, whereby the wheel may be withdrawn while the lining and the rollers remain in relationship on the journal when the wheel is withdrawn.

34. In a mine car wheel and axle structure, an axle journal, the combination of a hub open at its inner end to receive the lining, a hub lining removably engaged in the hub, abutment means on the outer part of the journal positioned to engage the outer end of said lining, and releasable means engaging the hub and the inner end of the lining for pressing said lining toward and against said abutment means, and rollers between said lining and the journal, whereby the wheel may be withdrawn while the lining and the rollers remain in relationship on the journal when the wheel is withdrawn.

35. In a mine car wheel and axle structure, an axle journal, the combination of a hub open at its inner end to receive the lining, a split hub lining removably engaged in the hub, abutment means on the outer part of the journal positioned to engage the outer end of said lining, and releasable means engaging the hub and the inner end of the lining for pressing said lining toward and against said abutment means, and rollers between said lining and the journal, whereby the wheel may be withdrawn while the lining and the rollers remain in relationship on the journal when the wheel is withdrawn.

36. In a wheel and axle structure for mine cars, an axle journal, the combination of the wheel hub open at its inner end to receive the lining, a hub lining removably bearing against the inner face of the hub and having its outer end in operative relation with the outer part of the journal to prevent outward movement of the lining and the inner end of said lining being adjacent the inner end of the hub, and means placing the inner end of the hub and the inner end of the lining into operative relation with each other to adapt said lining to serve as a thrust-member resisting outward movement of the hub.

37. In a wheel and axle structure for mine cars, an axle journal, the combination of the wheel hub open at its inner end to receive the lining, a hub lining removably bearing against the inner face of the hub and adapted to have its outer end pressed into engagement with the outer part of the journal to prevent outward movement of the lining and the inner end of said lining being adjacent the inner end of the hub, and means adjustable parallel to the hub axis and releasably placing the inner end of the hub and the lining into operative relation with each other to press the lining outward into engagement with the outer part of the journal, said pressure being maintained after such engagement with the outer part of the journal has been made.

38. In a wheel and axle structure for mine cars, an axle journal, the combination of the wheel hub open at its inner end to receive the thrust member, a thrust member located between the hub and the journal and adapted to have its outer end pressed into engagement with the outer part of the journal to prevent outward movement of the thrust member, and the inner end of said thrust member being adjacent the inner end of the hub, and means adjustable parallel to the hub axis and releasably placing the inner end of the hub and the thrust member into operative relation with each other to press the thrust member outward into engagement with the outer part of the journal, said pressure being maintained after such engagement with the outer part of the journal has been made.

39. In a wheel with anti-friction bearings, the combination of an axle structure, an abutment means secured against outward longitudinal movement in respect of the axle, a wheel-hub structure having end portions which seal the outer end of the axle structure, a split wearing lining inside the wheel hub and outside the anti-friction bearings, and removable from the inner end of the wheel hub structure, and the said lining being positioned for functioning against the said axle abutment means whereby the outward movement of the lining in respect to the axle structure is limited, and a locking means accessible from the front of the wheel which adjustably secures the wearing lining in respect of the hub structure whereby the outward movement of the hub structure in respect of the axle structure is limited.

40. In a wheel with anti-friction bearings, the combination of an axle structure, an abutment means secured against outward longitudinal movement in respect of the axle, a wheel-hub structure having end portions which seal the outer end of the axle structure, concentric means within the wheel hub structure and acting as rolling surfaces for the anti-friction bearings and the said concentric means being removable from the inner end of the hub structure and having portions functioning in respect of the said axle abutment means for limiting the outward movement of the concentric means in respect of the axle structure, and a locking means accessible at the outward end of the wheel which adjustably secures at least a part of the concentric means to the hub structure whereby the outward movement of the hub structure in respect of the axle structure is limited.

41. In combination with a roller bearing wheel loose on an axle, a wheel hub sealing the outer end of the axle, a secured split wheel hub wearing lining which acts as a wearing surface for the roller bearings and which also serves as a means for preventing the wheel from coming off the axle, a means accessible outside the wheel hub structure for pressing the wearing lining into the inner end of the wheel hub and for securing it against inward movement in reference to the wheel hub, a lubricant reservoir between the journal of the axle and the surrounding hub of the wheel, an abutment means in the lubricant chamber at the outer end of the axle and secured against outward movement in respect of the axle, and non-rotatably engaging the outer end of the said wearing lining and thus limiting the outward movement of the wearing lining in reference to the axle, and a wheel hub abutment means located within the lubricant chamber reservoir which serves to limit the inward movement of the wheel hub in respect of the axle.

In testimony whereof I have signed my name, this 29th day of December, in the year one thousand nine hundred and twenty-nine.

H. W. SANFORD.